(12) United States Patent
Li et al.

(10) Patent No.: US 11,185,826 B2
(45) Date of Patent: Nov. 30, 2021

(54) LIQUID MEMBRANE CONVEYING APPARATUS FOR PREPARING POROUS MEMBRANE

(71) Applicant: Microvast Power Systems Co., Ltd., Huzhou (CN)

(72) Inventors: Xiang Li, Huzhou (CN); Heji Huang, Huzhou (CN); Wei Li, Huzhou (CN); Binbin Wu, Huzhou (CN)

(73) Assignee: MICROVAST POWER SYSTEMS CO., LTD., Huzhou (CN)

( * ) Notice: Subject to any disclaimer, the term of this patent is extended or adjusted under 35 U.S.C. 154(b) by 96 days.

(21) Appl. No.: 16/028,448

(22) Filed: Jul. 6, 2018

(65) Prior Publication Data
US 2019/0009222 A1 Jan. 10, 2019

(30) Foreign Application Priority Data
Jul. 10, 2017 (CN) .......................... 201710556987.9

(51) Int. Cl.
*B01D 67/00* (2006.01)
*B01D 69/06* (2006.01)

(52) U.S. Cl.
CPC ..... *B01D 67/0016* (2013.01); *B01D 67/0009* (2013.01); *B01D 69/06* (2013.01); *B01D 2323/42* (2013.01)

(58) Field of Classification Search
CPC .......................... B01D 67/00; B01D 67/0016; B01D 67/0009; B01D 69/06; B01D 2323/42
See application file for complete search history.

(56) References Cited

U.S. PATENT DOCUMENTS

| | | | | |
|---|---|---|---|---|
| 1,562,560 | A * | 11/1925 | Hormel | B65G 17/063 198/408 |
| 3,471,606 | A * | 10/1969 | Corbett | B29C 55/06 264/209.5 |
| 4,482,514 | A * | 11/1984 | Schindler | B01D 71/56 264/41 |
| 4,734,196 | A | 3/1988 | Kono et al. | |
| 4,768,410 | A * | 9/1988 | Wood | B26D 5/32 235/489 |
| 4,772,440 | A * | 9/1988 | Kasi | B01D 67/0016 210/500.36 |

(Continued)

FOREIGN PATENT DOCUMENTS

| | | |
|---|---|---|
| CN | 101290358 A | 10/2008 |
| CN | 101632904 A | 1/2010 |

(Continued)

*Primary Examiner* — Jacob T Minskey
*Assistant Examiner* — Baileigh Kate Darnell
(74) *Attorney, Agent, or Firm* — Cheng-Ju Chiang

(57) ABSTRACT

The present disclosure provides a liquid membrane conveying apparatus for preparing a porous membrane includes a transmission unit and a carrier unit. The carrier unit conveys a liquid membrane into a gelling solution by the entrainment of the transmission unit. The carrier unit includes a first carrier and a second carrier. The first carrier and the second carrier respectively contact with opposite edges of the liquid membrane along a conveying direction of the liquid membrane. The consistency of the pores on the two surfaces of the porous membrane is improved by using the liquid membrane conveying apparatus.

34 Claims, 5 Drawing Sheets

(56) References Cited

U.S. PATENT DOCUMENTS

| | | | |
|---|---|---|---|
| 5,160,944 A * | 11/1992 | Fukumoto | B41J 13/036 101/408 |
| 5,768,964 A * | 6/1998 | Meschi | B26D 5/32 83/33 |
| 6,517,900 B1 * | 2/2003 | Pierre | B05C 1/0808 118/225 |
| 7,364,660 B2 * | 4/2008 | Takai | B01D 67/0009 210/490 |
| 8,114,478 B1 | 2/2012 | Koreltz et al. | |
| 8,932,509 B2 | 1/2015 | Miyachi et al. | |
| 2003/0156879 A1 * | 8/2003 | Dobrindt | B65H 9/16 400/578 |
| 2003/0173703 A1 * | 9/2003 | yamazaki | B01D 67/0011 264/216 |
| 2003/0224113 A1 | 12/2003 | Nakamura et al. | |
| 2004/0212112 A1 * | 10/2004 | Tsujimoto | B29C 41/28 264/1.34 |
| 2006/0205335 A1 * | 9/2006 | Bifulco | A22C 9/004 452/142 |
| 2014/0077405 A1 | 3/2014 | Funaoka | |
| 2014/0120286 A1 * | 5/2014 | Wendlandt | C08K 5/01 428/36.9 |
| 2014/0178517 A1 | 6/2014 | Lin | |
| 2015/0352751 A1 * | 12/2015 | Ramanan | B29D 99/005 264/138 |

FOREIGN PATENT DOCUMENTS

| | | |
|---|---|---|
| CN | 101910675 A | 12/2010 |
| CN | 202638292 U | 1/2013 |
| CN | 103387112 A | 11/2013 |
| CN | 103459478 A | 12/2013 |
| CN | 205044039 U | 2/2016 |
| CN | 205226236 U | 5/2016 |
| CN | 205235769 U | 5/2016 |
| JP | 2004-130797 A | 4/2004 |
| TW | 201538105 A | 10/2015 |

* cited by examiner

LIQUID MEMBRANE CONVEYING APPARATUS FOR PREPARING POROUS MEMBRANE

CROSS REFERENCE TO RELATED APPLICATION

The present application is based on and claims priority of Chinese Patent Application No. 201710556987.9, filed on Jul. 10, 2017. The entire disclosure of the above to identified application, including the specification and claims are incorporated herein by reference in its entirety.

FIELD OF THE INVENTION

The present disclosure relates to a liquid membrane conveying apparatus for preparing a porous membrane.

BACKGROUND OF THE INVENTION

The methods for preparing porous membranes mainly include non-solvent induced phase separation, thermally induced phase separation and evaporation induced phase separation methods. The non-solvent induced phase separation method forms the porous membrane by controlling the liquid-liquid phase separation of the polymer solution. In the process of preparing the porous membrane by the non-solvent induced phase separation method, the polymer solution membrane (i.e., the liquid membrane) needs to fully contact with the gelling solution to improve the porosity and pore quality of the porous membrane.

Presently, in the process of preparing the porous membrane by the non-solvent induced phase separation method, the liquid membrane is extruded on a steel belt or the like from an extrusion die, and the movement of the liquid membrane in the gelling solution is driven by the steel belt or the like. In this process, one surface of the liquid membrane fully contacts with the gelling solution, while the other surface of the liquid membrane could not in close contact with the gelling solution due to the other surface is in close contact with the steel belt. Therefore, the other surface of the liquid membrane has poor pore forming condition and low porosity, and even forming closed pores on this surface. This results the pore structures on the two opposite surfaces of the obtained porous membrane be asymmetry, and further affects the quality of the porous membrane.

SUMMARY OF THE INVENTION

The embodiments of the present disclosure provide a liquid membrane conveying apparatus for preparing a porous membrane includes a transmission unit and a carrier unit. The carrier unit conveys a liquid membrane into a gelling solution by the entrainment of the transmission unit. The carrier unit includes at least one first carrier and at least one second carrier. The first carrier and the second carrier respectively contact with opposite edges of the liquid membrane along a conveying direction of the liquid membrane.

The liquid membrane is a liquid membrane-like substance formed by extruding a solution or slurry for preparing the porous membrane from an extrusion die. The liquid membrane enters in and contacts with the gelling solution after the liquid membrane flows and attaches onto the carrier unit, and finally forms a porous membrane through liquid-liquid phase separation. During the conveying process of the liquid membrane, the carrier unit always keeps in contact with the opposite edges of the liquid membrane along the conveying direction. The edge of the liquid membrane means an area in the width direction of the liquid membrane that extends from the outermost boundary inwardly to a certain position in the middle of the liquid membrane (as shown in FIG. 8).

The carrier unit always keeps in contact with the opposite edges of the liquid membrane along the conveying direction. As shown in FIG. 8, the carrier unit and the liquid membrane may have many contact manners such as a portion of the carrier unit contacts with the edges of the liquid membrane with another portion of the carrier unit extending beyond the boundaries of the liquid membrane (shown in FIG. 8(a)), or the whole carrier unit contacts with the edges of the liquid membrane with the boundaries of the carrier unit aligning with the boundaries of the liquid membrane (shown in FIG. 8(b)), or the whole carrier unit contacts with the edges of the liquid membrane with the boundaries of the liquid membrane extending beyond the boundaries of the carrier unit (shown in FIG. 8(c)), or there are two groups of carrier units contact with the liquid membrane at each edge (shown in FIG. 8(d)), which improves the contact stability of the carrier unit and the edges of the liquid membrane.

In the process that the liquid membrane enters into the gelling solution under the entrainment of the carrier unit, since the carrier unit only keeps contact with the two opposite edges of the liquid membrane in the conveying direction, therefore, except for the two edges, the other portion of the liquid membrane are not in contact with the carrier unit. After entering into the gelling solution, the two surfaces of the liquid membrane could fully contact with the gelling solution, so as to ensure the consistency of the pore forming conditions of the two surfaces, which makes the pore structures on the two surfaces of the prepared porous membrane be symmetrical, with the porosity and the pore size distribution of the two surfaces being substantially the same. The entire conveying process is simple and easy to control and is suitable for large industrial production.

The liquid membrane conveying apparatus can be used for the preparation of porous membranes made of aromatic polyamide, polyvinyl chloride, vinylidene fluoride, and polyether sulfone.

In an embodiment of the present disclosure, the extrusion die is located above an end of the conveying apparatus, preferably right above the end of the conveying apparatus, so that the liquid membrane extruded from the extrusion die could flow onto the surface of the carrier unit according to the flow direction of its own weight, and then is conveyed into the gelling solution by the carrier unit.

In an embodiment of the present disclosure, the area where the first carrier contacts with the liquid membrane accounts for 0.1% to 35.0% of the total area of the liquid membrane.

In an embodiment of the present disclosure, the area where the first carrier contacts with the liquid membrane accounts for 0.3% to 20.0% of the total area of the liquid membrane.

In an embodiment of the present disclosure, the area where the first carrier contacts with the liquid membrane accounts for 0.5% to 5.0% of the total area of the liquid membrane.

In an embodiment of the present disclosure, the area where the second carrier contacts with the liquid membrane accounts for 0.1% to 35.0% of the total area of the liquid membrane.

In an embodiment of the present disclosure, the area where the second carrier contacts with the liquid membrane accounts for 0.3% to 20.0% of the total area of the liquid membrane.

In an embodiment of the present disclosure, the area where the second carrier contacts with the liquid membrane accounts for 0.5% to 5.0% of the total area of the liquid membrane.

The proportion of the area of the carrier unit contacting with the liquid membrane to the total area of the liquid membrane enables the carrier unit to better support and fix the liquid membrane, so that the liquid membrane moves with the carrier unit in the gelling solution and allows the upper and lower surfaces of the liquid membrane to contact with the gelling solution as much as possible. If the proportion is too large, the uniformity of the pore formation conditions of the upper and lower surfaces of the liquid membrane will be broken, and the ratio of the area of the upper and lower surface portions of the liquid membrane having the symmetrical pore structures to the total area of the entire porous membrane will be reduced. If the proportion is too small, the force acting on the liquid membrane by the carrier unit will be reduced, and the liquid membrane will slide or fall off from the carrier unit. Therefore, the liquid membrane could not be effectively carried and driven to move in the gelling solution.

In order for further control the stability in the conveying process of the liquid membrane, in an embodiment of the present disclosure, the carrier unit includes two fixing structures for fixing the opposite edges of the liquid membrane. The fixing structures are needles and/or clips. The fixing structures are fixedly attached to the carrier unit or integrated with the carrier unit into a single piece. The fixing structures fix the liquid membrane to the carrier unit so that the liquid membrane could enter in the gelling solution with the carrier unit under the entrainment of the transmission unit.

In an embodiment of the present disclosure, the surface of the carrier unit in contact with the liquid membrane is a planar surface.

In an embodiment of the present disclosure, the surface of the carrier unit in contact with the liquid membrane includes a plurality of smooth regions and/or a plurality of rough regions. In an embodiment of the present disclosure, the surface of the carrier unit in contact with the liquid membrane includes a plurality of smooth regions and a plurality of rough regions, and the smooth regions and the rough regions are placed in an alternate manner. In the present disclosure, the shape of the smooth region or the rough region is not limited. The shape of the smooth region or the rough region could be regular shapes (as shown in FIG. 4(s)) or non-regular shapes (as shown in FIG. 4(t)). In another embodiment of the present disclosure, the entire surface of the carrier unit could be rough region.

The rough regions in the present disclosure increase the friction between the liquid membrane and the surface of the carrier unit, further benefits for fixing the liquid membrane and preventing the liquid membrane from falling off or sliding along the directions perpendicular to and parallel to the conveying direction due to shrinkage of the liquid membrane, thereby keeping the stability between the carrier unit and the liquid membrane during transportation. On the other hand, the rough regions reduce the surface of the carrier unit that directly contacts with the liquid membrane and facilitates the removal of the prepared porous membrane from the mold.

In an embodiment of the present disclosure, a roughness Ra of the rough region is greater than or equal to 100. In another embodiment of the present disclosure, the roughness Ra of the rough region is in a range from 100 to 1000.

The selected roughness Ra of the present disclosure benefits for forming the porous membrane having a symmetrical pore structure on the upper and lower surfaces thereof. If the roughness is too small, the liquid membrane easily slides off from the surface of the carrier unit and could not provide a good carry effect. If the roughness is too large, debris will remain on the rough surface when the porous membrane is peeled off from the carrier unit, and the debris will be carried into the gelling solution and adhere to the porous membrane, which further affects the quality of the formed membrane.

In an embodiment of the present disclosure, the surface of the carrier unit in contact with the liquid membrane is a non-planar surface.

On the one hand, the design that the surface of the carrier unit is non-planar surface increases the friction between the liquid membrane and the surface of the carrier unit, and prevents the liquid membrane from falling off or sliding due to shrinkage along the directions perpendicular to and parallel to the conveying direction, thereby keeping the stability between the carrier unit and the liquid membrane during transportation. On the other hand, the non-planar surface reduces the area of the surface of the carrier unit that directly contacts with the liquid membrane and facilitates the removal of the prepared porous membrane from the mold.

In an embodiment of the present disclosure, the surface of the carrier unit in contact with the liquid membrane is a non-planar surface. At least one portion of the non-planar surface is a rough region. A roughness Ra of the rough region is greater than or equal to 100, or a roughness Ra of the rough region is in a range from 100 to 1000.

In an embodiment of the present disclosure, the surface of the carrier unit in contact with the liquid membrane includes anti-slip structures and/or liquid storage structures, for forming a carrier surface with a plurality of solid regions and a plurality of non-solid regions between the liquid membrane and the carrier unit. The areas where the liquid membrane is in direct contact with the surface of the carrier unit are solid regions, and the areas where the liquid membrane does not directly contact with the surface of the carrier unit are non-solid regions. By means of adjusting the shape, the distance, and the amount of liquid storage of the surface structure of the carrier unit, a carrier surface including a planar or non-planar surface (as shown in FIG. 5) is formed between the liquid membrane and the carrier unit.

In an embodiment of the present disclosure, the area ratio of the solid region and the non-solid region of the carrier surface is in the range from 1:9 to 9:1. If the carrier surface is non-planar surface (shown in FIG. 5(b)), the abovementioned area is the area of a non-planar curved surface.

In an embodiment of the present disclosure, the area ratio of the solid region and the non-solid region of the carrier surface is in the range from 3:7 to 7:3.

In an embodiment of the present disclosure, the area ratio of the solid region and the non-solid region of the carrier surface is in the range from 4:6 to 6:4.

The solid region is used for adhering the liquid membrane, and the non-solid region facilitates adhering the liquid membrane to the solid region after the liquid membrane shrinks when meeting the gelling solution and thereby enhancing the friction therebetween. The cooperation between the solid region and the non-solid region improves the carry effect of the liquid membrane on the carrier unit, and prevents the liquid membrane from falling off or slipping during the carrying and conveying process, and further benefits for forming the porous membrane having a symmetrical pore structure on the upper and lower surfaces thereof.

In an embodiment of the present disclosure, the carrier surface includes at least one solid region and at least one non-solid region.

In an embodiment of the present disclosure, the at least one solid region and the at least one non-solid region are placed in an alternate manner.

In an embodiment of the present disclosure, the non-solid region includes liquid region and/or gas region. If liquid is stored in the non-solid region, the non-solid region is regarded as a liquid region. If there is no liquid in the non-solid region, the non-solid region is regarded as a gas region. During conveying, the structures capable of storing liquid helps the carrier unit to bring liquid from the gelling solution or store the liquid brought by a wet spraying process to form a liquid region. The liquid region helps to solidify the liquid membrane and to peel off the porous membrane. After the edges of the liquid membrane come into contact with the liquid region, the contact portion solidifies due to the precipitation of the solvent, so that the edges along the conveying direction of the liquid membrane includes a solidified portion (the portion contact with the liquid region) and a non-solidified portion (the portion not in contact with the liquid region) before the liquid membrane enters the gelling bath. This further increases the friction between the liquid membrane and the surface of the carrier unit, and prevents the liquid membrane from falling off or slipping along the directions perpendicular to and parallel to the conveying direction due to shrinkage. In addition, due to the carrier surface includes the liquid region, the subsequent peeling off of the porous membrane is further facilitated.

In an embodiment of the present disclosure, the carrier surface includes at least one solid region and at least one gas region.

In an embodiment of the present disclosure, the at least one solid region and the at least one gas region are placed in an alternate manner.

In an embodiment of the present disclosure, the carrier surface includes at least one solid region and at least one liquid region.

In an embodiment of the present disclosure, the at least one solid region and the at least one liquid region are placed in an alternate manner.

In an embodiment of the present disclosure, the anti-slip structure includes projections and/or grooves. The projection and/or the groove can be fixedly attached to the surface of the carrier unit by additional components, or the projection and/or the groove can be integrated with the carrier unit into a single piece, such as the projection or the groove can be formed by the projection or the groove formed on the surface of the carrier unit.

In an embodiment of the present disclosure, the liquid storage structure includes grooves and/or projections with indentations formed in the middle of the projections.

In an embodiment of the present disclosure, the projections include but not limited to at least one of a ridge (shown in FIG. 4(c)), a cylinder (shown in FIG. 4(f)), a cylindrical tube (shown in FIG. 4(e)), a cone (shown in FIG. 4(i)), a truncated cone (shown in FIG. 4(j)), a middle spherical frustum (shown in FIG. 4(p)), an elliptic cylinder (shown in FIG. 4(n)), a needle, a prism (shown in FIG. 4(k)), a pyramid (shown in FIG. 4(l)), a truncated pyramid (shown in FIG. 4(q)), and a curve surface protrusion (shown in FIG. 4(b) and FIG. 4(o)).

In an embodiment of the present disclosure, the grooves include grooves penetrating the carrier unit, and/or grooves not penetrating the carrier unit.

In an embodiment of the present disclosure, the grooves penetrating the carrier unit are configured in but not limited to comb shape, tooth shape and hollow-carved shape.

In an embodiment of the present disclosure, the surface of the carrier unit in contact with the liquid membrane includes a plurality of rectangular grooves not penetrating the carrier unit, the rectangular grooves include a plurality of first rectangular grooves, the long edges of the first rectangular grooves are parallel to each other and perpendicular to the conveying direction of the liquid membrane.

The size of the rectangular groove can be arranged according to the size of the obtained liquid membrane. In an embodiment of the present disclosure, the width of the rectangular groove is in the range from 0.5 mm to 10.0 mm. The width means the distance between the long edges of the rectangular groove. In another embodiment of the present disclosure, the width of the rectangular groove is in the range from 2.0 mm to 5.0 mm.

In an embodiment of the present disclosure, the rectangular grooves further include a plurality of second rectangular grooves, the long edges of the second rectangular grooves are parallel to each other and parallel to the conveying direction of the liquid membrane.

The first rectangular grooves and the second rectangular grooves respectively restrict the relative movement between the liquid membrane and the carrier unit along directions parallel to and perpendicular to the conveying direction, and better prevent the liquid membrane from falling off due to shrinkage.

In an embodiment of the present disclosure, at least one of the first rectangular grooves connects with at least one of the second rectangular grooves. This structure further benefits the liquid membrane entering into the grooves, thereby increasing the contact force between the liquid membrane and the surface of the carrier unit, and meanwhile facilitating the liquid membrane to intimately contact with the first rectangular grooves and the second rectangular grooves after the liquid membrane shrinks due to it encounters the gelling solution. This prevents the liquid membrane from falling off or slipping due to shrinkage along the directions perpendicular to and parallel to the conveying direction.

In an embodiment of the present disclosure, at least one of the short edges of the first rectangular groove is opened.

In an embodiment of the present disclosure, at least one of the short edges of the second rectangular groove is opened.

On one hand, the opening structure is benefit for processing, and on the other hand, when the liquid membrane covers the short edge of the groove, the opening structure makes the liquid membrane at the short edge of the groove does not adhere to the carrier unit, thereby reducing the occurrence of membrane rupture at the edge of the carrier unit during removal of the liquid membrane.

In an embodiment of the present disclosure, in a direction perpendicular to the conveying direction of the liquid membrane, the first rectangular grooves and the second rectangular grooves are placed on the surface of the first carrier between a position close to the second carrier and a position away from the second carrier. This structure further increases the contact force between the liquid membrane and the surface of the carrier unit, and prevents the liquid membrane from falling off or slipping due to shrinkage along the directions perpendicular to and parallel to the conveying direction.

In an embodiment of the present disclosure, in a direction perpendicular to the conveying direction of the liquid membrane, the first rectangular grooves and the second rectangular grooves are placed on the surface of the second carrier between a position close to the first carrier and a position away from the first carrier.

In an embodiment of the present disclosure, in the conveying process, the liquid storage structures are kept in a liquid state. For the groove structures, by means of adjusting the size of the groove and/or the material of the carrier unit, when the surface of the carrier unit is sprayed by liquid, the grooves are filled with liquid so that a carrier surface including at least one solid region and at least one liquid region is formed between the liquid membrane and the carrier unit. This structure further increases the friction between the liquid membrane and the surface of the carrier unit, and prevents the liquid membrane from falling off or slipping due to shrinkage along the directions perpendicular to and parallel to the conveying direction. In addition, since the carrier surface includes the liquid region, the subsequent peeling off of the porous membrane is further facilitated.

In an embodiment of the present disclosure, in the conveying process, the surface of the carrier unit is subjected but not limited to a wetting process so that the liquid storage structure is kept in a liquid state.

In an embodiment of the present disclosure, the wetting process includes but not limited to spraying liquid to the surface of the carrier unit.

In an embodiment of the present disclosure, the liquid sprayed to the surface of the carrier unit is water.

In an embodiment of the present disclosure, the liquid sprayed to the surface of the carrier unit is a gelling solution with increased water content, that is, the water content in the liquid is greater than the water content in the gelling solution. The liquid membrane of the present disclosure refers to a liquid membrane-like substance formed by extruding a solution or slurry of a porous membrane from an extrusion die. The porous membrane solution or slurry can be made by mixing a raw material of porous membrane (high molecular polymer) with a solvent. In an embodiment, the gelling solution includes a co-solvent, water, and a solvent that can dissolve the corresponding high molecular polymer. In an embodiment, the water content in the gelling liquid is 30%, and the water content in the liquid is greater than 30%. The higher the water content is, the shorter the gelling time is. The water content in the present embodiment is benefit for finishing the gelling process before the liquid membrane of present disclosure leaving the gelling solution. For example, if an aromatic polyamide porous membrane is prepared, in an embodiment, the solution or slurry of the porous membrane can be an aromatic polyamide solution formed by mixing an aromatic polyamide fiber, a solvent, and a co-solvent. In an embodiment, the aromatic polyamide fibers are selected from aromatic polyamide staple fibers and/or aromatic polyamide fibrids. In an embodiment, the solvent is selected from at least one of N-methylpyrrolidone (NMP), N,N-dimethylacetamide (DMAC), N,N-dimethylformamide (DMF), dimethylsulfoxide (DMSO) and triethyl phosphate (TEP). The co-solvent is selected from at least one of sodium chloride, lithium chloride, calcium chloride, and magnesium chloride. In an embodiment, the aromatic polyamide porous membrane may also be formed by a polymerization reaction of an aromatic polyamide solution. However, the present disclosure is not limited to the above selection.

In the conveying process, the liquid region may not be formed by spraying liquid on the surface of the carrier unit, but be formed by storing some of the gelling solution in the grooves and/or the indentations of the projections of the carrier unit when the carrier unit passes through the gelling solution.

The structures on the surface of the first carrier in contact with the liquid membrane may be the same as or different from the structures on the surface of the second carrier in contact with the liquid membrane. There may be a plurality of first carriers, and the structures on the surfaces of the first carriers contacting the liquid membranes may be the same or different. There may be a plurality of second carriers, and the structures on the surfaces of the second carriers contacting with the liquid membranes may be the same or different. The first carrier and/or the second carrier may include at least one group (as shown in FIG. 8(d)).

In an embodiment of the present disclosure, the transmission unit includes a transmission plate.

The transmission plate is a single-piece structure with less components and high reliability.

In an embodiment of the present disclosure, the carrier unit is integrated with the transmission plate into a single piece, or the carrier unit is fixedly attached to the transmission plate.

In an embodiment of the present disclosure, the transmission unit includes a driving wheel, a transmission chain and/or a transmission belt.

In an embodiment of the present disclosure, the transmission unit includes at least two groups of transmission chains and/or transmission belts.

In order to change the conveying path of the liquid membrane, or to achieve a multi-level solidification which means let the liquid membrane pass through multiple levels of gelling solutions with different concentrations. In an embodiment of the present disclosure, the transmission unit further includes a supporting part.

In an embodiment of the present disclosure, the supporting part includes a supporting wheel, a roller or a gear. By adjusting the number and the positional relationship of the transmission units, the conveying path of the liquid membrane can be changed, and the multi-level solidification or a multi-level cleaning can also be realized, i.e., let the liquid membrane pass through multi-levels of gelling solution pools with different concentrations (as shown in FIG. 10) or let the liquid membrane pass through multiple cleaning pools. The multi-level solidification could control the gelling time by controlling the water content of the gelling solutions of each level, thereby realizing the quality control of the porous membrane according to requirements.

In an embodiment of the present disclosure, the carrier unit is located on a chain link of the transmission chain.

In an embodiment of the present disclosure, the carrier unit is integrated with the chain link of the transmission chain into a single piece or the carrier unit is fixedly attached to the chain link of the transmission chain.

In an embodiment of the present disclosure, the chain link includes a link plate.

In an embodiment of the present disclosure, the carrier unit is integrated with the link plate into a single piece or the carrier unit is fixedly attached to the link plate.

In an embodiment of the present disclosure, the carrier unit is integrated with the transmission belt into a single piece or the carrier unit is fixedly attached to the transmission belt.

In an embodiment of the present disclosure, the surface of the first carrier in contact with the liquid membrane has an arbitrary point A, the surface of the second carrier in contact with the liquid membrane has an arbitrary point B, in a liquid membrane conveying process of the liquid membrane, the distance between the point A and the point B is changed.

The distance between the point A and the point B on the carrier unit changes, so that the width of the liquid membrane carried by the carrier unit changes accordingly. Therefore, the width of the liquid membrane can be designed according to actual requirements. For example, when the liquid membrane is casted to the carrier unit and enters into the gelling solution with the carrier unit, the width of the liquid membrane becomes larger, which can prevent or compensate the shrinkage of the liquid membrane in the gelling solution along the directions perpendicular to and parallel to the conveying direction. When the liquid membrane is about to leave the gelling solution, the width of the liquid membrane becomes smaller, which can provide a buffer before the liquid membrane is further stretched.

In an embodiment of the present disclosure, a line connecting the point A with the point B perpendiculars to the conveying direction of the liquid membrane.

In an embodiment of the present disclosure, the minimum distance between point A and point B is L, the maximum distance between point A and point B is L', and the ratio between the minimum distance L and the maximum distance L' is 1:1 to 1:1.2.

In order to make the abovementioned purposes, characteristics and advantages be more apparent and understandable, detailed descriptions accompanying preferred embodiments are given below.

DETAILED DESCRIPTION OF PREFERRED EMBODIMENTS

Embodiments of the present disclosure will now be described more apparently and completely with reference to the embodiments. Obviously, the illustrated embodiments are only a part but not all of the embodiments of the present disclosure. All the other embodiments which could be obtained without creativity by one of ordinary skill in the art according to the illustrated embodiments would be claimed within the scope of the present disclosure.

Embodiment 1

Figure 1:
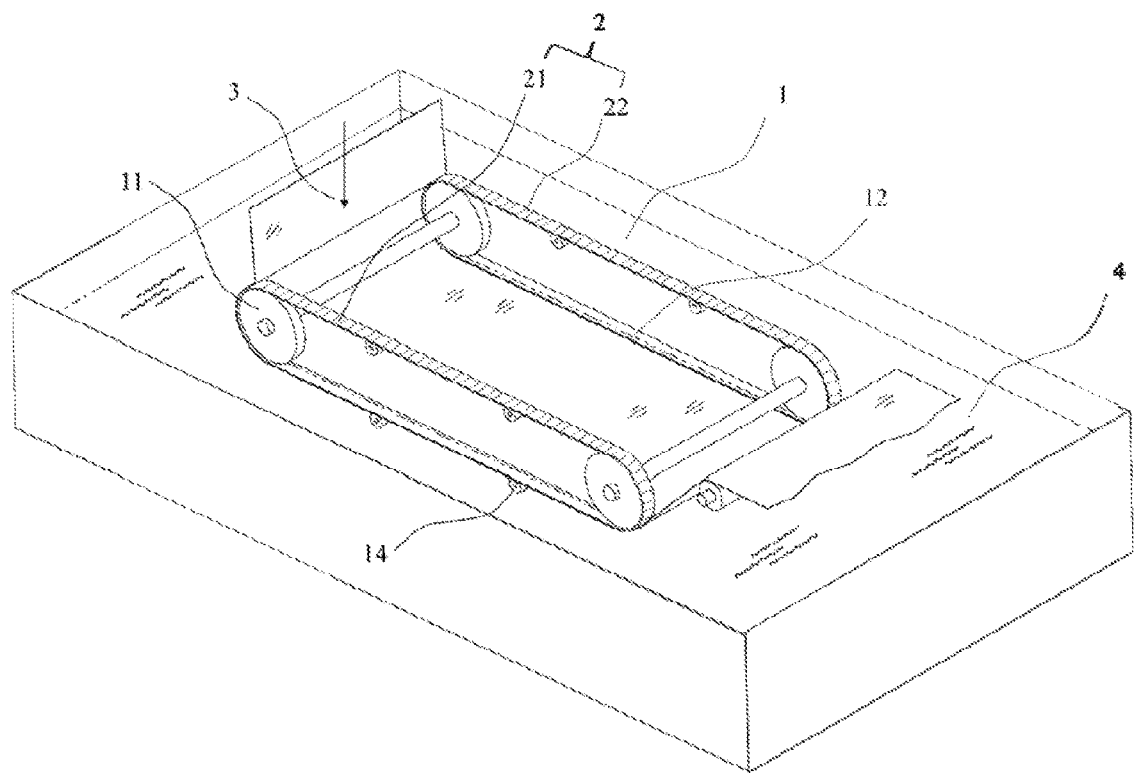
FIG. 1 is a schematic view shown an embodiment of the present disclosure.

FIG. 1 shows a liquid membrane conveying apparatus for preparing a porous membrane according to an embodiment of the present disclosure. The liquid membrane conveying apparatus includes a transmission unit 1 and a carrier unit 2. The transmission unit 1 includes a driving wheel 11 and a transmission belt 12. The carrier unit 2 includes a first carrier 21 and a second carrier 22. The carrier unit 2 is located on the transmission belt 12 and integrated with the transmission belt 12 into a single piece. In a liquid membrane conveying process, after the liquid membrane 3 for preparing the porous membrane is extruded from the extrusion die, the first carrier 21 and the second carrier 22 of the carrier unit 2 respectively contact with opposite edges of the liquid membrane 3 along a conveying direction of the liquid membrane 3. Under the entrainment of the transmission unit 1, the carrier unit 2 conveys the liquid membrane 3 into a gelling solution 4 to perform gel curing.

Embodiment 2

FIG. 1 shows a liquid membrane conveying apparatus for preparing a porous membrane according to an embodiment of the present disclosure. The liquid membrane conveying apparatus includes a transmission unit 1 and a carrier unit 2. The transmission unit 1 includes a driving wheel 11 and a transmission belt 12. The carrier unit 2 includes a first carrier 21 and a second carrier 22. The carrier unit 2 is located on the transmission belt 12 and integrated with the transmission belt 12 into a single piece. A surface of the carrier unit 2 is a planar smooth surface. In a liquid membrane conveying process, after the liquid membrane 3 for preparing the porous membrane is extruded from the extrusion die, the first carrier 21 and the second carrier 22 of the carrier unit 2 respectively contact with opposite edges of the liquid membrane 3 along a conveying direction of the liquid membrane 3. Under the entrainment of the transmission unit 1, the carrier unit 2 conveys the liquid membrane 3 into a gelling solution 4 to perform gel curing.

Embodiment 3

Embodiment 3 is substantially the same as embodiment 2. The difference from embodiment 3 and embodiment 2 is that the surface of the carrier unit 2 of embodiment 3 is a rough surface with a roughness Ra of 1000.

Embodiment 4

FIG. 1 shows a liquid membrane conveying apparatus for preparing a porous membrane according to an embodiment of the present disclosure. The liquid membrane conveying apparatus includes a transmission unit 1 and a carrier unit 2. The transmission unit 1 includes a driving wheel 11 and a transmission belt 12. The carrier unit 2 includes a first carrier 21 and a second carrier 22. The carrier unit 2 is located on the transmission belt 12 and integrated with the transmission belt 12 into a single piece. As shown in FIG. 4(s), a surface of the carrier unit 2 includes a plurality of smooth regions and a plurality of rough regions alternately distributed with the smooth regions (the rough region is shown as the shadow region in the figure), and the rough region has a roughness Ra of 800. In a liquid membrane conveying process, after the liquid membrane 3 for preparing the porous membrane is extruded from the extrusion die, the first carrier 21 and the second carrier 22 of the carrier unit 2 respectively contact with opposite edges of the liquid membrane 3 along a conveying direction of the liquid membrane 3. Under the entrainment of the transmission unit 1, the carrier unit 2 conveys the liquid membrane 3 into a gelling solution 4 to perform gel curing.

Embodiment 5

As shown in FIG. 1, a liquid membrane conveying apparatus for preparing a porous membrane of the present disclosure includes a transmission unit 1 and a carrier unit 2. The transmission unit 1 includes a driving wheel 11, a transmission belt 12 and a supporting part 14. In this embodiment, the supporting part 14 is a roller placed under the transmission belt 12. The carrier unit 2 includes a first carrier 21 and a second carrier 22. The carrier unit 2 is located on the transmission belt 12 and fixedly fixed to the transmission belt 12. In a liquid membrane conveying process, after the liquid membrane 3 for preparing the porous membrane is extruded from the extrusion die, the first carrier 21 and the second carrier 22 of the carrier unit 2 respectively contact with opposite edges of the liquid membrane 3 along a conveying direction of the liquid membrane 3. Under the entrainment of the transmission unit 1, the carrier unit 2 conveys the liquid membrane 3 into a gelling solution 4 to perform gel curing.

Figure 6:
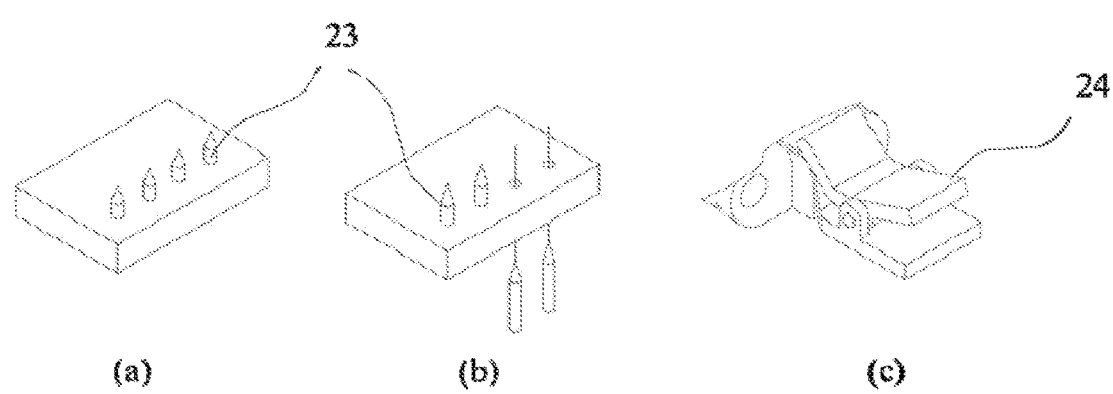
FIG. 6 is a schematic view shown a fixing structure of the carrier unit according to an embodiment of the present disclosure.

As shown in FIG. 6(c), on a surface of the carrier unit 2 which contacts with the liquid membrane 3, two fixing structures such as two clips 24 for fixing the two edges of the liquid membrane 3 are provided, and the clips 24 are fixedly connected to the carrier unit 2.

Embodiment 6

As shown in FIG. 1, a liquid membrane conveying apparatus for preparing a porous membrane of the present disclosure includes a transmission unit 1 and a carrier unit 2. The transmission unit 1 includes a driving wheel 11, a transmission belt 12 and a supporting part 14. In this embodiment, the supporting part 14 is a supporting wheel placed under the transmission belt 12. The carrier unit 2 includes a first carrier 21 and a second carrier 22. The carrier unit 2 is located on the transmission belt 12 and fixedly attached to the transmission belt 12. In a liquid membrane conveying process, after the liquid membrane 3 for preparing the porous membrane is extruded from the extrusion die, the first carrier 21 and the second carrier 22 of the carrier unit 2 respectively contact with opposite edges of the liquid membrane 3 along a conveying direction of the liquid membrane 3. Under the entrainment of the transmission unit 1, the carrier unit 2 conveys the liquid membrane 3 into a gelling solution 4 to perform gel curing.

As shown in FIG. 6(c), on a surface of the carrier unit 2 which contacts with the liquid membrane 3, two fixing structures such as two clips 24 for fixing the two edges of the liquid membrane 3 are provided, and the clips 24 are integrated with the carrier unit 2 into a single piece.

Further in this embodiment, the area where the first carrier 21 contacts with the liquid membrane 3 accounts for 0.1% of the total area of the liquid membrane 3, and the area where the second carrier 22 contacts with the liquid membrane 3 accounts for 0.1% of the total area of the liquid membrane 3.

Embodiment 7

Figure 2:
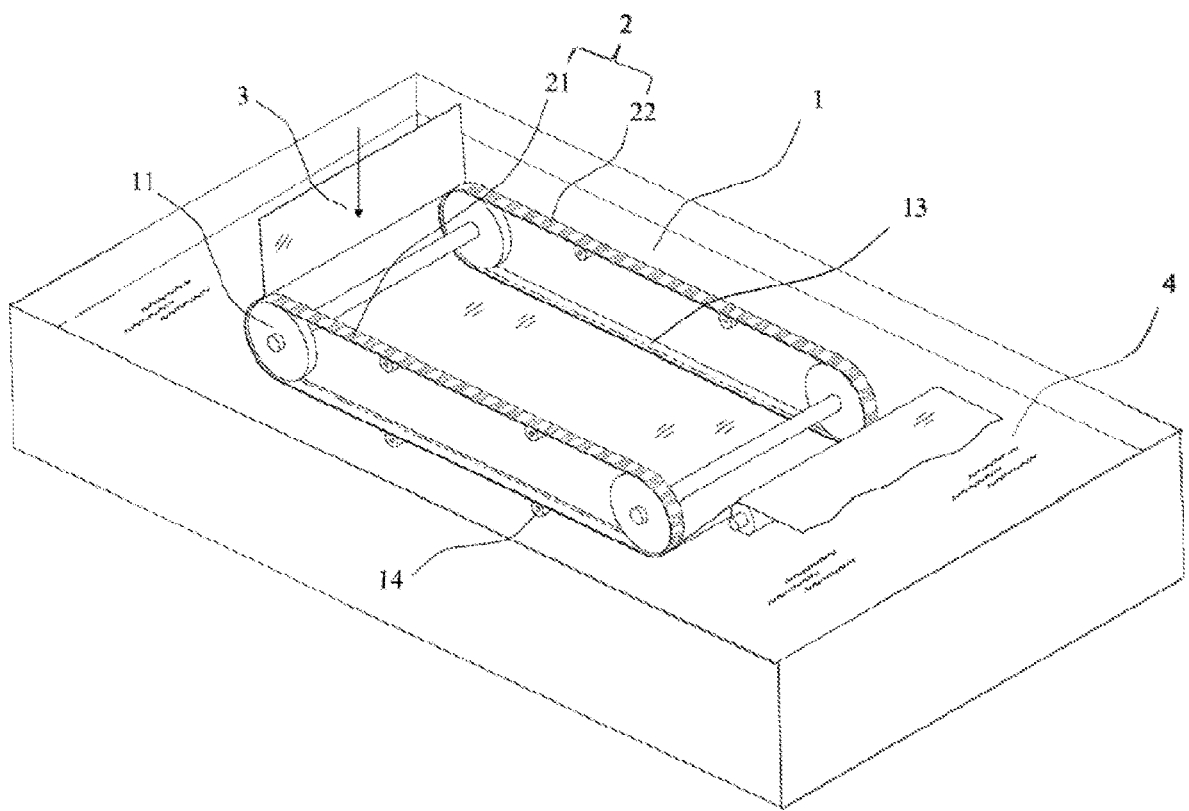
FIG. 2 is a schematic view shown another embodiment of the present disclosure.

FIG. 2 shows a liquid membrane conveying apparatus for preparing a porous membrane of the present disclosure. The liquid membrane conveying apparatus includes a transmission unit 1 and a carrier unit 2. The transmission unit 1 includes a driving wheel 11, a transmission chain 13, and a supporting part 14. In this embodiment, the supporting part 14 is a gear. The carrier unit 2 includes a first carrier 21 and a second carrier 22. The transmission chain 13 includes a plurality of chain links, and the carrier unit 2 is integrated with the chain links into a single piece. In the liquid membrane conveying process, after the liquid membrane 3 for preparing the porous membrane is extruded from the extrusion die, the first carrier 21 and the second carrier 22 of the carrier unit 2 respectively contact with opposite edges of the liquid membrane 3 along a conveying direction of the liquid membrane 3, so that the whole carrier unit 2 are in contact with the edges of the liquid membrane 3, and the boundaries of the carrier unit 2 are aligned with the boundaries of the liquid membrane 3, as shown in FIG. 8(b). Under the entrainment of the transmission unit 1, the carrier unit 2 conveys the liquid membrane 3 into a gelling solution 4 to perform gel curing.

As shown in FIGS. 6(a) and 6(b), on the surface of the carrier unit 2 which contacts with the liquid membrane 3, a plurality of needles 23 for fixing the two edges of the liquid membrane are provided, and the needles 23 are integrated with the carrier unit 2 into a single piece.

The area where the first carrier 21 which contacts with the liquid membrane 3 accounts for 10.0% of the total area of the liquid membrane 3, and the area where the second carrier 22 contacts with the liquid membrane 3 accounts for 10.0% of the total area of the liquid membrane 3.

Embodiment 8

Figure 3:
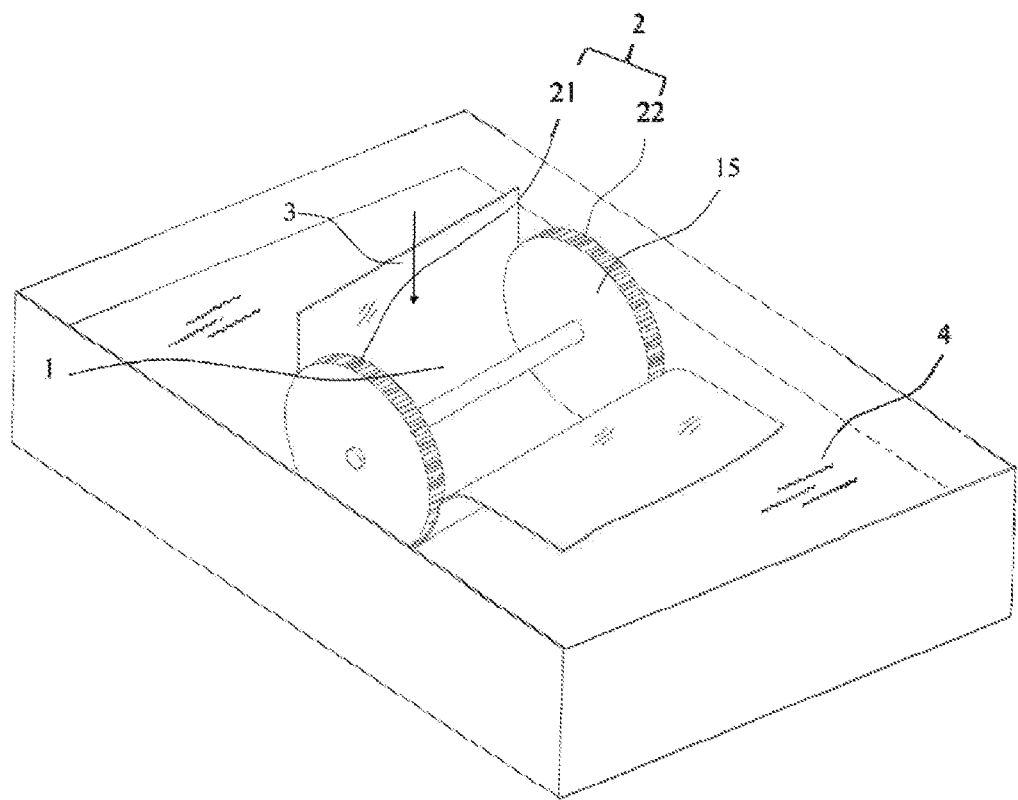
FIG. 3 is a schematic view shown a further embodiment of the present disclosure.

FIG. 3 shows a liquid membrane conveying apparatus for preparing a porous membrane of the present disclosure. The liquid membrane conveying apparatus includes a transmission unit 1 and a carrier unit 2. The transmission unit 1 includes a transmission plate 15. The carrier unit 2 includes a first carrier 21 and a second carrier 22, and the carrier unit 2 is fixed on the transmission plate 15. A surface of the carrier unit 2 includes a plurality of smooth regions and a plurality of rough regions alternately distributed with the smooth regions (the rough region is shown as the shadow region in the figure), and the rough region has a roughness Ra of 100. In the liquid membrane conveying process, after the liquid membrane 3 for preparing the porous membrane is extruded from the extrusion die, the first carrier 21 and the second carrier 22 of the carrier unit 2 respectively contact with opposite edges of the liquid membrane 3 along a conveying direction of the liquid membrane 3 so that the whole carrier unit 2 are in contact with the edges of the liquid membrane 3, and the boundaries of the liquid membrane 3 extend beyond the boundaries of the carrier unit 2, as shown in FIG. 8(c). Under the entrainment of the transmission unit 1, the carrier unit 2 conveys the liquid membrane 3 into a gelling solution 4 to perform gel curing.

The area where the first carrier 21 contacts with the liquid membrane 3 accounts for 20.0% of the total area of the liquid membrane 3, and the area where the second carrier 22 contacts with the liquid membrane 3 accounts for 20.0% of the total area of the liquid membrane 3.

Embodiment 9

Figure 10:
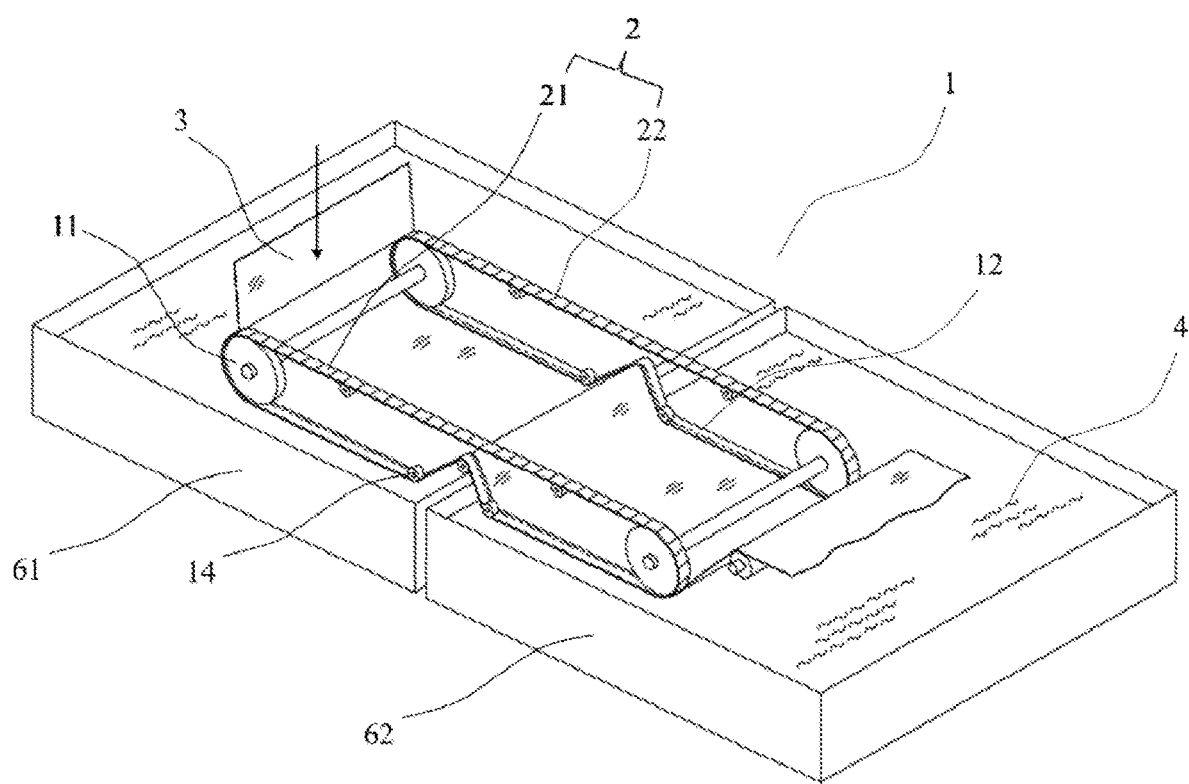
FIG. 10 is a schematic view shown a further another again embodiment of the present disclosure.

FIG. 10 shows a liquid membrane conveying apparatus for preparing a porous membrane of the present disclosure. The liquid membrane conveying apparatus includes a transmission unit 1 and a carrier unit 2. The transmission unit 1 includes a driving wheel 11, a transmission belt 12 and a supporting part 14. In this embodiment, the supporting part 14 is a supporting wheel. The carrier unit 2 includes a first carrier 21 and a second carrier 22. The carrier unit 2 is located on the transmission belt 12 and integrated with the transmission belt 12 into a single piece. As shown in FIG. 4(s), a surface of the carrier unit 2 includes a plurality of smooth regions and a plurality of rough regions alternately distributed with the smooth regions (the rough region is shown as the shadow region in the figure), and the rough region has a roughness Ra of 500. As shown in FIG. 8(a), in a liquid membrane conveying process, after the liquid membrane 3 for preparing the porous membrane is extruded from the extrusion die, the first carrier 21 and the second carrier 22 of the carrier unit 2 respectively contact with opposite edges of the liquid membrane 3 along a conveying direction of the liquid membrane 3, with a portion of the carrier unit 2 contacting with the edges of the liquid membrane 3, and the other portion of the carrier unit 2 extending beyond the liquid membrane 3. Under the entrainment of the transmission unit 1, the carrier unit 2 conveys the liquid membrane 3 into a gelling solution 4 to perform gel curing.

As shown in FIG. 10, the gelling solution 4 includes two regions having different water contents. The two regions are respectively located in two adjacent and isolated gelling pools, i.e., a first gelling pool 61 and a second gelling pool 62. The water content of the gelling solution in the first gelling pool 61 is 30%, and the water content of the gelling solution in the second gelling pool 62 is 50%. The supporting part 14 is located above the adjacent interface of the first gelling pool 61 and the second gelling pool 62. In the liquid membrane transport process, the transport path of the liquid membrane 3 is changed by the supporting parts 14, and by the support of the supporting parts 14, the carrier unit 2 conveys the liquid membrane 3 passing through the gelling solution 4 in the first gelling pool 61 and then entering in the gelling solution 4 in the second gelling pool 62.

Embodiment 10

As shown in FIG. 1, a liquid membrane conveying apparatus for preparing a porous membrane of the present disclosure includes a transmission unit 1 and a carrier unit 2. The transmission unit 1 includes a driving wheel 11, a transmission belt 12 and a supporting part 14. In this embodiment, the supporting part 14 is a supporting wheel. The carrier unit 2 includes a first carrier 21 and a second carrier 22. The carrier unit 2 is located on the transmission belt 12 and integrated with the transmission belt 12 into a single piece. As shown in FIG. 8(a), in a liquid membrane conveying process, after the liquid membrane 3 for preparing the porous membrane is extruded from the extrusion die, the first carrier 21 and the second carrier 22 of the carrier unit 2 respectively contact with opposite edges of the liquid membrane 3 along a conveying direction of the liquid membrane 3, with a portion of the carrier unit 2 contacting with the edges of the liquid membrane 3, and the other portion of the carrier unit 2 extending beyond the liquid membrane 3. Under the entrainment of the transmission unit 1, the carrier unit 2 conveys the liquid membrane 3 into a gelling solution 4 to perform gel curing.

An anti-slip structure is provided on a surface of the carrier unit 2 which contacts with the liquid membrane 3, and the anti-slip structure is a ridge as shown in FIG. 4(c). Therefore, as shown in FIGS. 5(a) and 5(b), when the carrier unit 2 contacts with the liquid membrane 3, a carrier surface 5 with a solid region 51 and a non-solid region 52 is formed. The area ratio of the solid region 51 and the non-solid region 52 is 7:3. There is no liquid in the non-solid region 52 and the non-solid region 52 is regarded as a gas region.

The area where the first carrier 21 contacts with the liquid membrane 3 accounts for 35.0% of the total area of the liquid membrane 3, and the area where the second carrier 22 contacts with the liquid membrane 3 accounts for 35.0% of the total area of the liquid membrane 3.

Embodiment 11

Embodiment 11 is substantially the same as embodiment 10. The difference from embodiment 11 and embodiment 10 is that the anti-slip structure in embodiment 11 is a diamond-shaped projection as shown in FIG. 4(g).

Embodiment 12

Embodiment 12 is substantially the same as embodiment 10. The difference from embodiment 11 and embodiment 10 is that the anti-slip structure in embodiment 12 is a circular recess as shown in FIG. 4(d).

Embodiment 13

Embodiment 13 is substantially the same as embodiment 12. The difference from embodiment 13 and embodiment 12 is that except for the portion with circular recess, the other portion of the surface of the carrier unit 2 is rough surface with a roughness Ra of 200.

Embodiment 14

As shown in FIG. 1, a liquid membrane conveying apparatus for preparing a porous membrane of the present disclosure includes a transmission unit 1 and a carrier unit 2. The transmission unit 1 includes a driving wheel 11, a transmission belt 12 and a supporting part 14. In this embodiment, the supporting part 14 is a supporting wheel. The carrier unit 2 includes a first carrier 21 and a second carrier 22. The carrier unit 2 is located on and fixed to the transmission belt 12. As shown in FIG. 8(a), in a liquid membrane conveying process, after the liquid membrane 3 for preparing the porous membrane is extruded from the extrusion die, the first carrier 21 and the second carrier 22 of the carrier unit 2 respectively contact with opposite edges of the liquid membrane 3 along a conveying direction of the liquid membrane 3, with a portion of the carrier unit 2 contacting with the edges of the liquid membrane 3, and the other portion of the carrier unit 2 extending beyond the liquid membrane 3. Under the entrainment of the transmission unit 1, the carrier unit 2 conveys the liquid membrane 3 into a gelling solution 4 to perform gel curing.

On a surface of the carrier unit 2 in contact with the liquid membrane 3, a plurality of liquid storage structures are provided, and the liquid storage structures are rectangular grooves as shown in FIG. 4(h). Therefore, as shown in FIG. 5, when the carrier unit 2 contacts with the liquid membrane 3, a carrier surface 5 with a solid region 51 and a non-solid region 52 is formed. The area ratio of the solid region 51 and the non-solid region 52 is 1:9. In the conveying process, the liquid storage structure carries gelling solution when the carrier unit 2 leaves the gelling solution, therefore, the non-solid region 52 stores liquid therein and the non-solid region 52 is regarded as a liquid region.

The area where the first carrier 21 contacts the liquid membrane 3 accounts for 0.5% of the total area of the liquid membrane 3, and the area where the second carrier 22 contacts the liquid membrane 3 accounts for 0.5% of the total area of the liquid membrane 3.

Embodiment 15

As shown in FIG. 1, a liquid membrane conveying apparatus for preparing a porous membrane of the present disclosure includes a transmission unit 1 and a carrier unit 2. The transmission unit 1 includes a driving wheel 11, a transmission belt 12 and a supporting part 14. In this embodiment, the supporting part 14 is a supporting wheel. As shown in FIG. 8(d), the carrier unit 2 includes two groups of parallel first carriers 21 and two groups of parallel second carriers 22. The carrier unit 2 is located on the transmission belt 12 and integrated with the transmission belt 12 into a single piece. As shown in FIG. 8(c), in a liquid membrane conveying process, after the liquid membrane 3 for preparing the porous membrane is extruded from the extrusion die, the first carrier 21 and the second carrier 22 of the carrier unit 2 respectively contact with opposite edges of the liquid membrane 3 along a conveying direction of the liquid membrane 3, with the whole carrier unit 2 contacting with the edges of the liquid membrane 3, and the boundaries of the liquid membrane 3 extending beyond boundaries of the carrier unit 2. Under the entrainment of the transmission unit 1, the carrier unit 2 conveys the liquid membrane 3 into a gelling solution 4 to perform gel curing. In this embodiment, the water content of the gelling solution is 30%.

On a surface of the carrier unit 2 in contact with the liquid membrane 3, a plurality of liquid storage structures are provided, and the liquid storage structures are rectangular grooves as shown in FIG. 4(h). Therefore, as shown in FIG. 5, when the carrier unit 2 contacts with the liquid membrane 3, a carrier surface 5 with a solid region 51 and a non-solid region 52 is formed. The area ratio of the solid region 51 and the non-solid region 52 is 6:4. Before the carrier unit 2 contacts with the liquid membrane 3, the surface of the carrier unit 2 is subjected to a wetting process, and a gelling solution having a water content of 50% is sprayed to the surface so that the non-solid region 52 is in a liquid state and is regarded as a liquid region.

The area of the first carrier 21 in contact with the liquid membrane 3 accounts for 5.0% of the total area of the liquid membrane 3, and the area of the second carrier 22 in contact with the liquid membrane 3 accounts for 5.0% of the total area of the liquid membrane 3.

Embodiment 16

Embodiment 16 is substantially the same as embodiment 15. The difference from embodiment 16 and embodiment 15 is that, when the surface of the carrier unit 2 is subjected to a wetting process, the fluid being sprayed to the surface is water.

Embodiment 17

Another liquid membrane conveying apparatus for preparing a porous membrane of the present disclosure includes a transmission unit 1 and a carrier unit 2. The transmission unit 1 includes a driving wheel 11, a transmission chain 13, and a supporting part 14. In this embodiment, the supporting part 14 is a gear. The carrier unit 2 includes a first carrier 21 and a second carrier 22. The transmission chain 13 includes a plurality of chain links, the chain link includes a link plate, and the carrier unit 2 is integrated with the link plates into a single piece. As shown in FIG. 8(b), in a liquid membrane conveying process, after the liquid membrane 3 for preparing the porous membrane is extruded from the extrusion die, the first carrier 21 and the second carrier 22 of the carrier unit 2 respectively contact with opposite edges of the liquid membrane 3 along a conveying direction of the liquid membrane 3, with the whole carrier unit 2 contacting with the edges of the liquid membrane 3, and the boundaries of the carrier unit 2 aligning with the boundaries of the liquid membrane 3. Under the entrainment of the transmission unit 1, the carrier unit 2 conveys the liquid membrane 3 into a gelling solution 4 to perform gel curing.

On a surface of the carrier unit 2 in contact with the liquid membrane 3, a plurality of spaced first rectangular grooves not penetrating the carrier unit 2 are provided. As shown in FIG. 5, when the carrier unit 2 contacts with the liquid membrane 3, a carrier surface 5 with a solid region 51 and a non-solid region 52 is formed. The long edges of the first rectangular grooves are parallel to each other and perpendicular to the conveying direction of the liquid membrane 3. In this embodiment, the width of the first rectangular groove is 10.0 mm.

The area where the first carrier 21 contacts with the liquid membrane 3 accounts for 1.0% of the total area of the liquid membrane 3. The area where the second carrier 22 contacts with the liquid membrane 3 accounts for 1.0% of the total area of the liquid membrane 3.

Embodiment 18

Embodiment 18 is substantially the same as embodiment 17. The difference from embodiment 18 and embodiment 17 is that the width of the first rectangular groove is 1.0 mm.

Embodiment 19

A liquid membrane conveying apparatus for preparing a porous membrane of the present disclosure includes a transmission unit 1 and a carrier unit 2. The transmission unit 1 includes a driving wheel 11, a transmission chain 13, and a supporting part 14. In this embodiment, the supporting part 14 is a gear. The carrier unit 2 includes a first carrier 21 and a second carrier 22. The carrier unit 2 is located on and fixedly attached to the transmission chain 13. As shown in FIG. 8(a), in a liquid membrane conveying process, after the liquid membrane 3 for preparing the porous membrane is extruded from the extrusion die, the first carrier 21 and the second carrier 22 of the carrier unit 2 respectively contact with opposite edges of the liquid membrane 3 along a conveying direction of the liquid membrane 3, with a portion of the carrier unit 2 contacting with the edges of the liquid membrane 3, and the other portion of the carrier unit 2 extending beyond the boundaries of the liquid membrane 3. Under the entrainment of the transmission unit 1, the carrier unit 2 conveys the liquid membrane 3 into a gelling solution 4 to perform gel curing. In this embodiment, the water content of the gelling solution 4 is 30%.

On a surface of the carrier unit 2 in contact with the liquid membrane 3, a plurality of spaced first rectangular grooves not penetrating the carrier unit 2 are provided. The long edges of the first rectangular grooves are parallel to each other and perpendicular to the conveying direction of the liquid membrane 3. In this embodiment, the width of the first rectangular groove is 4.0 mm. Furthermore, a plurality of spaced second rectangular grooves are also provided on a surface of the carrier unit 2 in contact with the liquid membrane 3. The long edges of the second rectangular grooves are parallel to each other and parallel to the conveying direction of the liquid membrane 3. In this embodiment, the width of the second rectangular groove is 5.0 mm.

In the conveying process, a gelling solution having a water content of 40% is sprayed on the surface of the carrier unit 2, and a carrier surface 5 with a solid region 51 and a non-solid region 52 as shown in FIG. 5 is formed, wherein the non-solid region 52 is regarded as a liquid region.

The area where the first carrier 21 contacts with the liquid membrane 3 accounts for 0.8% of the total area of the liquid membrane 3. The area where the second carrier 22 contacts with the liquid membrane 3 accounts for 0.8% of the total area of the liquid membrane 3.

Embodiment 20

A liquid membrane conveying apparatus for preparing a porous membrane of the present disclosure includes a transmission unit 1 and a carrier unit 2. The transmission unit 1 includes a driving wheel 11, a transmission chain 13, and a supporting part 14. In this embodiment, the supporting part 14 is a gear. The carrier unit 2 includes a first carrier 21 and a second carrier 22. The carrier unit 2 is located on and fixedly attached to the transmission chain 13. As shown in FIG. 8(a), in a liquid membrane conveying process, after the liquid membrane 3 for preparing the porous membrane is extruded from the extrusion die, the first carrier 21 and the second carrier 22 of the carrier unit 2 respectively contact with opposite edges of the liquid membrane 3 along a conveying direction of the liquid membrane 3, with a portion of the carrier unit 2 contacting with the edges of the liquid membrane 3, and the other portion of the carrier unit 2 extending beyond the boundaries of the liquid membrane 3. Under the entrainment of the transmission unit 1, the carrier unit 2 conveys the liquid membrane 3 into a gelling solution 4 to perform gel curing. In this embodiment, the water content of the gelling solution 4 is 30%.

As shown in FIG. 4(m), a plurality of spaced first rectangular grooves not penetrating the carrier unit 2 are provided on a surface of the carrier unit 2 in contact with the liquid membrane 3. In a direction perpendicular to the conveying direction of the liquid membrane 3, a plurality of spaced first rectangular grooves and a plurality of spaced second rectangular grooves are placed on the surface of the first carrier 21 between a position close to the second carrier 22 and a position away from the second carrier 22. A plurality of first rectangular grooves and a plurality of second rectangular grooves are placed on the surface of the second carrier 22 between a position close to the first carrier 21 and a position away from the first carrier 21. On the surfaces of the first carrier 21 and the second carrier 22, the first rectangular groove connects with the nearest second rectangular groove. On the surface of the first carrier 21, a short edge of the first rectangular groove close to the second carrier 22 is opened. On the surface of the second carrier 22, a short edge of the first rectangular groove close to the first carrier 21 is opened. On the surfaces of the first carrier 21 and the second carrier 22, both of the short edges of the second rectangular grooves are opened.

In the conveying process, a gelling solution having a water content of 40% is sprayed on the surface of the carrier unit 2, and a carrier surface 5 with a solid region 51 and a non-solid region 52 as shown in FIG. 5 is accordingly formed, wherein the non-solid region 52 is regarded as a liquid region.

The area where the first carrier 21 contacts with the liquid membrane 3 accounts for 0.8% of the total area of the liquid membrane 3. The area where the second carrier 22 contacts with the liquid membrane 3 accounts for 0.8% of the total area of the liquid membrane 3.

Embodiment 21

A liquid membrane conveying apparatus for preparing a porous membrane of the present disclosure includes a transmission unit 1 and a carrier unit 2. The transmission unit 1 includes a driving wheel 11, a transmission belt 12, and a supporting part 14. In this embodiment, the supporting part 14 is a gear. The carrier unit 2 includes a first carrier 21 and a second carrier 22. As shown in FIG. 7(a), the carrier unit 2 is located on the transmission belt 12 and integrated with the transmission belt 12 into a single piece. As shown in FIG. 8(a), in a liquid membrane conveying process, after the liquid membrane 3 for preparing the porous membrane is extruded from the extrusion die, the first carrier 21 and the second carrier 22 of the carrier unit 2 respectively contact with opposite edges of the liquid membrane 3 along a conveying direction of the liquid membrane 3, with a portion of the carrier unit 2 contacting with the edges of the liquid membrane 3, and the other portion of the carrier unit 2 extending beyond the boundaries of the liquid membrane 3. Under the entrainment of the transmission unit 1, the carrier unit 2 conveys the liquid membrane 3 into a gelling solution 4 to perform gel curing.

As shown in FIG. 4(a), a plurality of spaced rectangular grooves penetrating the carrier unit 2 are provided on a surface of the carrier unit 2 in contact with the liquid membrane 3. An end of the rectangular groove is opened and the carrier unit 2 is configured in comb-shape. The long edges of the rectangular groove are parallel to each other and perpendicular to the conveying direction of the liquid membrane 3. The width of the rectangular groove is 3.0 mm. The edges of the liquid membrane 3 is in contact with the carrier unit 2, forming a carrier surface 5 (shown in FIG. 5) having a solid region 51 and a non-solid region 52. The solid region 51 and the non-solid region 52 are arranged in an alternate manner, and the non-solid region 52 is regarded as a gas region.

The area where the first carrier 21 contacts with the liquid membrane 3 accounts for 1.0% of the total area of the liquid membrane 3. The area where the second carrier 22 contacts with the liquid membrane 3 accounts for 1.0% of the total area of the liquid membrane 3.

Embodiment 22

A liquid membrane conveying apparatus for preparing a porous membrane of the present disclosure includes a transmission unit 1 and a carrier unit 2. The transmission unit 1 includes a driving wheel 11, a transmission belt 12, and a supporting part 14. In this embodiment, the supporting part 14 is a gear. The carrier unit 2 includes a first carrier 21 and a second carrier 22. As shown in FIG. 7(b), the carrier unit 2 is located on and fixedly attached to the transmission belt 12 by screws. As shown in FIG. 8(a), in a liquid membrane conveying process, after the liquid membrane 3 for preparing the porous membrane is extruded from the extrusion die, the first carrier 21 and the second carrier 22 of the carrier unit 2 respectively contact with opposite edges of the liquid membrane 3 along a conveying direction of the liquid membrane 3, with a portion of the carrier unit 2 contacting with the edges of the liquid membrane 3, and the other portion of the carrier unit 2 extending beyond the boundaries of the liquid membrane 3. Under the entrainment of the transmission unit 1, the carrier unit 2 conveys the liquid membrane 3 into a gelling solution 4 to perform gel curing.

Figure 4:
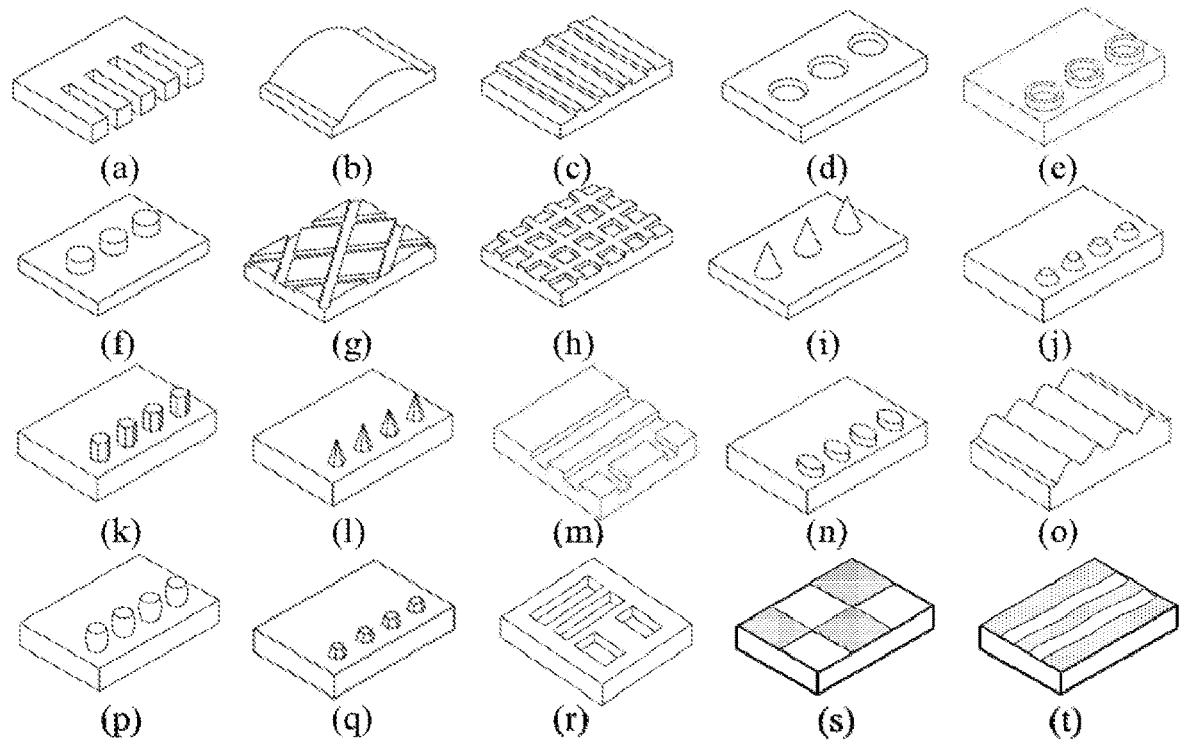
FIG. 4 is a schematic view shown a surface of a carrier unit of an embodiment of the present disclosure.
Figure 5:
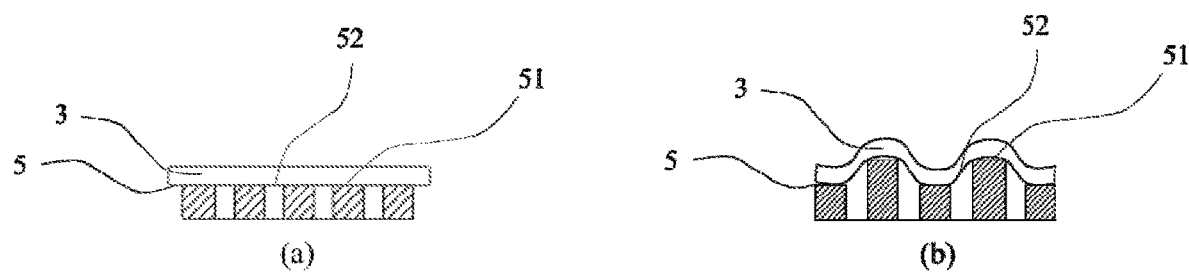
FIG. 5 is a schematic view shown a carrier surface formed by contacting the liquid member with the carrier unit according to an embodiment of the present disclosure.

As shown in FIG. 4(*a*), a plurality of spaced rectangular grooves penetrating the carrier unit 2 are provided on a surface of the carrier unit 2 in contact with the liquid membrane 3. An end of the rectangular groove is opened and the carrier unit 2 is configured in comb-shape. The long edges of the rectangular groove are parallel to each other and perpendicular to the conveying direction of the liquid membrane 3. The width of the rectangular groove is 3.0 mm. The edges of the liquid membrane 3 is in contact with the carrier unit 2, forming a carrier surface 5 (shown in FIG. 5) having a solid region 51 and a non-solid region 52. The solid region 51 and the non-solid region 52 are arranged in an alternate manner, and the non-solid region 52 is regarded as a gas region.

The area where the first carrier 21 contacts with the liquid membrane 3 accounts for 4.0% of the total area of the liquid membrane 3. The area where the second carrier 22 contacts with the liquid membrane 3 accounts for 4.0% of the total area of the liquid membrane 3.

Embodiment 23

Figure 7:
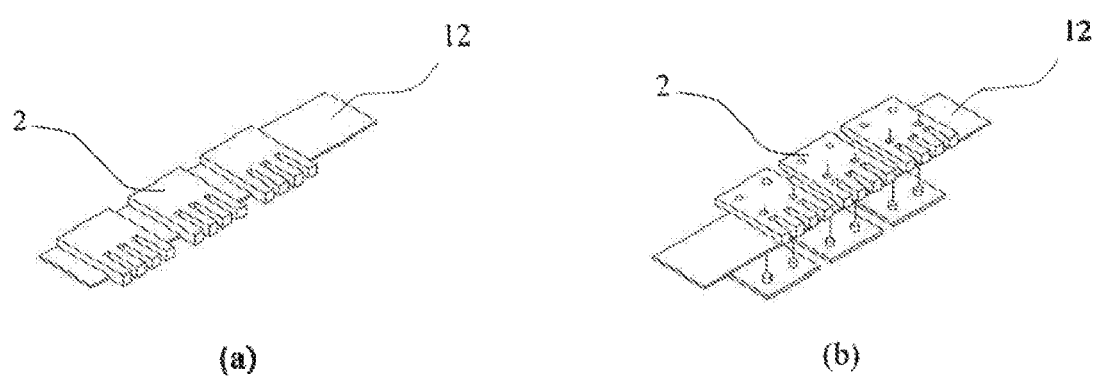
FIG. 7 is a schematic view shown a connection manner of the carrier unit and a transmission unit according to an embodiment of the present disclosure.
Figure 7:
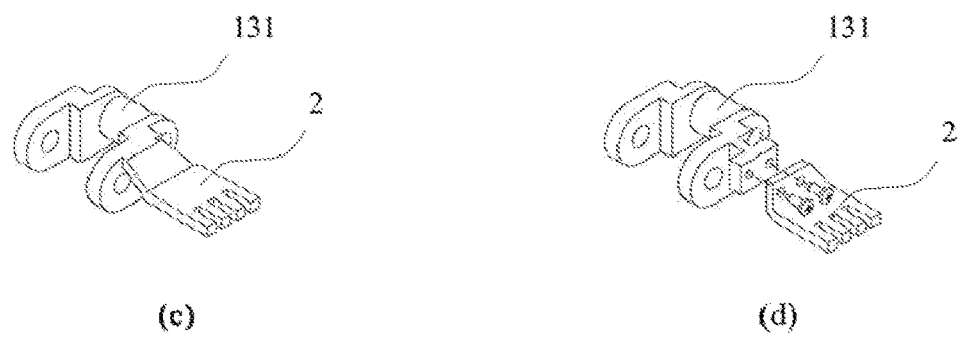
Figure 8:
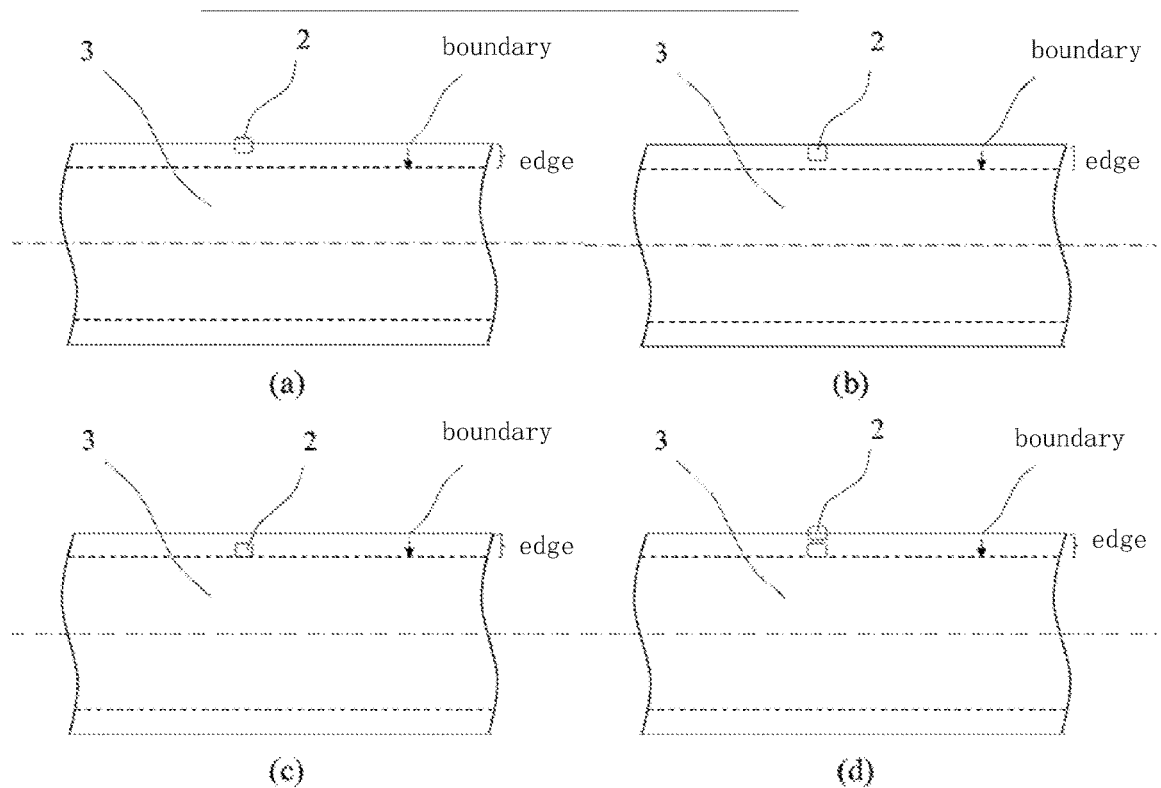
FIG. 8 is a schematic view shown a contact manner of the edges of the liquid membrane and the carrier unit.

A liquid membrane conveying apparatus for preparing a porous membrane of the present disclosure includes a transmission unit 1 and a carrier unit 2. The transmission unit 1 includes a driving wheel 11, a transmission chain 13, and a supporting part 14. In this embodiment, the supporting part 14 is a gear. The carrier unit 2 includes a first carrier 21 and a second carrier 22. The carrier unit 2 is located on the transmission chain 13. As shown in FIG. 7(*c*), the carrier unit 2 is integrated with chain links 131 of the transmission chain 13 into a single piece. As shown in FIG. 8(*a*), in a liquid membrane conveying process, after the liquid membrane 3 for preparing the porous membrane is extruded from the extrusion die, the first carrier 21 and the second carrier 22 of the carrier unit 2 respectively contact with opposite edges of the liquid membrane 3 along a conveying direction of the liquid membrane 3, with a portion of the carrier unit 2 contacting with the edges of the liquid membrane 3, and the other portion of the carrier unit 2 extending beyond the boundaries of the liquid membrane 3. Under the entrainment of the transmission unit 1, the carrier unit 2 conveys the liquid membrane 3 into a gelling solution 4 to perform gel curing.

As shown in FIG. 4(*a*), a plurality of spaced rectangular grooves penetrating the carrier unit 2 are provided on a surface of the carrier unit 2 in contact with the liquid membrane 3. An end of the rectangular groove is opened and the carrier unit 2 is configured in comb-shape. The long edges of the rectangular groove are parallel to each other and perpendicular to the conveying direction of the liquid membrane 3. The width of the rectangular groove is 3.0 mm. The edges of the liquid membrane 3 is in contact with the carrier unit 2, forming a carrier surface 5 (shown in FIG. 5) having a solid region 51 and a non-solid region 52. The surface of the carrier unit 2 is subjected to a wetting process, and water is sprayed to the surface so that the non-solid region 52 is in a liquid state and is regarded as a liquid region.

The area where the first carrier 21 contacts with the liquid membrane 3 accounts for 15.0% of the total area of the liquid membrane 3. The area where the second carrier 22 contacts with the liquid membrane 3 accounts for 15.0% of the total area of the liquid membrane 3.

Embodiment 24

A liquid membrane conveying apparatus for preparing a porous membrane of the present disclosure includes a transmission unit 1 and a carrier unit 2. The transmission unit 1 includes a driving wheel 11, a transmission chain 13, and a supporting part 14. In this embodiment, the supporting part 14 is a gear. The carrier unit 2 includes a first carrier 21 and a second carrier 22. The carrier unit 2 is located on the transmission chain 13. As shown in FIG. 7(*d*), the carrier unit 2 is fixedly attached to chain links 131 of the transmission chain 13 by screws. As shown in FIG. 8(*a*), in a liquid membrane conveying process, after the liquid membrane 3 for preparing the porous membrane is extruded from the extrusion die, the first carrier 21 and the second carrier 22 of the carrier unit 2 respectively contact with opposite edges of the liquid membrane 3 along a conveying direction of the liquid membrane 3, with a portion of the carrier unit 2 contacting with the edges of the liquid membrane 3, and the other portion of the carrier unit 2 extending beyond the boundaries of the liquid membrane 3. Under the entrainment of the transmission unit 1, the carrier unit 2 conveys the liquid membrane 3 into a gelling solution 4 to perform gel curing.

As shown in FIG. 4(*a*), a plurality of spaced rectangular grooves penetrating the carrier unit 2 are provided on a surface of the carrier unit 2 in contact with the liquid membrane 3. An end of the rectangular groove is opened and the carrier unit 2 is configured in comb-shape. The long edges of the rectangular groove are parallel to each other and perpendicular to the conveying direction of the liquid membrane 3. The width of the rectangular groove is 2.0 mm. The edges of the liquid membrane 3 is in contact with the carrier unit 2, forming a carrier surface 5 (shown in FIG. 5) having a solid region 51 and a non-solid region 52. The surface of the carrier unit 2 is subjected to a wetting process, and water is sprayed to the surface so that the non-solid region 52 is in a liquid state and is regarded as a liquid region.

The area where the first carrier 21 contacts with the liquid membrane 3 accounts for 1.0% of the total area of the liquid membrane 3. The area where the second carrier 22 contacts with the liquid membrane 3 accounts for 1.0% of the total area of the liquid membrane 3.

Embodiment 25

A liquid membrane conveying apparatus for preparing a porous membrane of the present disclosure includes a transmission unit 1 and a carrier unit 2. The transmission unit 1 includes a driving wheel 11, a transmission chain 13, and a supporting part 14. In this embodiment, the supporting part 14 is a gear. The carrier unit 2 includes a first carrier 21 and a second carrier 22. The carrier unit 2 is located on and fixedly attached to the transmission chain 13. As shown in FIG. 8(*a*), in a liquid membrane conveying process, after the liquid membrane 3 for preparing the porous membrane is extruded from the extrusion die, the first carrier 21 and the second carrier 22 of the carrier unit 2 respectively contact with opposite edges of the liquid membrane 3 along a conveying direction of the liquid membrane 3, with a portion of the carrier unit 2 contacting with the edges of the liquid membrane 3, and the other portion of the carrier unit 2 extending beyond the boundaries of the liquid membrane 3. Under the entrainment of the transmission unit 1, the carrier unit 2 conveys the liquid membrane 3 into a gelling solution 4 to perform gel curing.

A plurality of spaced first rectangular grooves penetrating the carrier unit 2 are provided on a surface of the carrier unit 2 in contact with the liquid membrane 3. The long edges of the first rectangular grooves are parallel to each other and perpendicular to the conveying direction of the liquid membrane 3. The width of the first rectangular groove is 4.0 mm. Furthermore, a plurality of spaced second rectangular grooves penetrating the carrier unit 2 are provided on a surface of the carrier unit 2 in contact with the liquid membrane 3. The long edges of the second rectangular grooves are parallel to each other and perpendicular to the conveying direction of the liquid membrane 3. The width of the second rectangular groove is 5.0 mm.

As shown in FIG. 4(r), in a direction perpendicular to the conveying direction of the liquid membrane 3, a plurality of first rectangular grooves and a plurality of second rectangular grooves are placed on the surface of the first carrier 21 between a position close to the second carrier 22 and a position away from the second carrier 22, respectively. A plurality of first rectangular grooves and a plurality of second rectangular grooves are placed on the surface of the second carrier 22 between a position close to the first carrier 21 and a position away from the first carrier 21, respectively. On the surfaces of the first carrier 21 and the second carrier 22, the first rectangular groove does not connect with the nearest second rectangular groove. The short edges of the first rectangular grooves and the second rectangular groove are not open, and the carrier unit 2 is configured in a hollow-carved frame. The edges of the liquid membrane 3 is in contact with the carrier unit 2, forming a carrier surface 5 (shown in FIG. 5) having a solid region 51 and a non-solid region 52. The surface of the carrier unit 2 is subjected to a wetting process, and water is sprayed to the surface so that the non-solid region 52 is in a liquid state and is regarded as a liquid region.

The area where the first carrier 21 contacts with the liquid membrane 3 accounts for 0.5% of the total area of the liquid membrane 3. The area where the second carrier 22 contacts with the liquid membrane 3 accounts for 0.5% of the total area of the liquid membrane 3.

Embodiment 26

A liquid membrane conveying apparatus for preparing a porous membrane of the present disclosure includes a transmission unit 1 and a carrier unit 2. The transmission unit 1 includes a driving wheel 11, a transmission chain 13, and a supporting part 14. In this embodiment, the supporting part 14 is a gear. The carrier unit 2 includes a first carrier 21 and a second carrier 22. The carrier unit 2 is located on and fixedly attached to the transmission chain 13. As shown in FIG. 8(a), in a liquid membrane conveying process, after the liquid membrane 3 for preparing the porous membrane is extruded from the extrusion die, the first carrier 21 and the second carrier 22 of the carrier unit 2 respectively contact with opposite edges of the liquid membrane 3 along a conveying direction of the liquid membrane 3, with a portion of the carrier unit 2 contacting with the edges of the liquid membrane 3, and the other portion of the carrier unit 2 extending beyond the boundaries of the liquid membrane 3. Under the entrainment of the transmission unit 1, the carrier unit 2 conveys the liquid membrane 3 into a gelling solution 4 to perform gel curing.

In this embodiment, the liquid membrane conveying apparatus has a plurality of carrier units 2 in contact with the liquid membrane 3, and the surfaces of the carrier units 2 are provided with different surface structures as shown in FIG. 4. The carrier units 2 having the different groups, each with the same surface structures, are arranged in and are sequentially arranged on the transmission chain 13.

Embodiment 27

Embodiment 27 is substantially the same as embodiment 26. The difference from embodiment 27 and embodiment 26 is that the carrier units 2 have the different surface structures and are disorderly arranged on the transmission chain 13.

Embodiment 28

Figure 9:
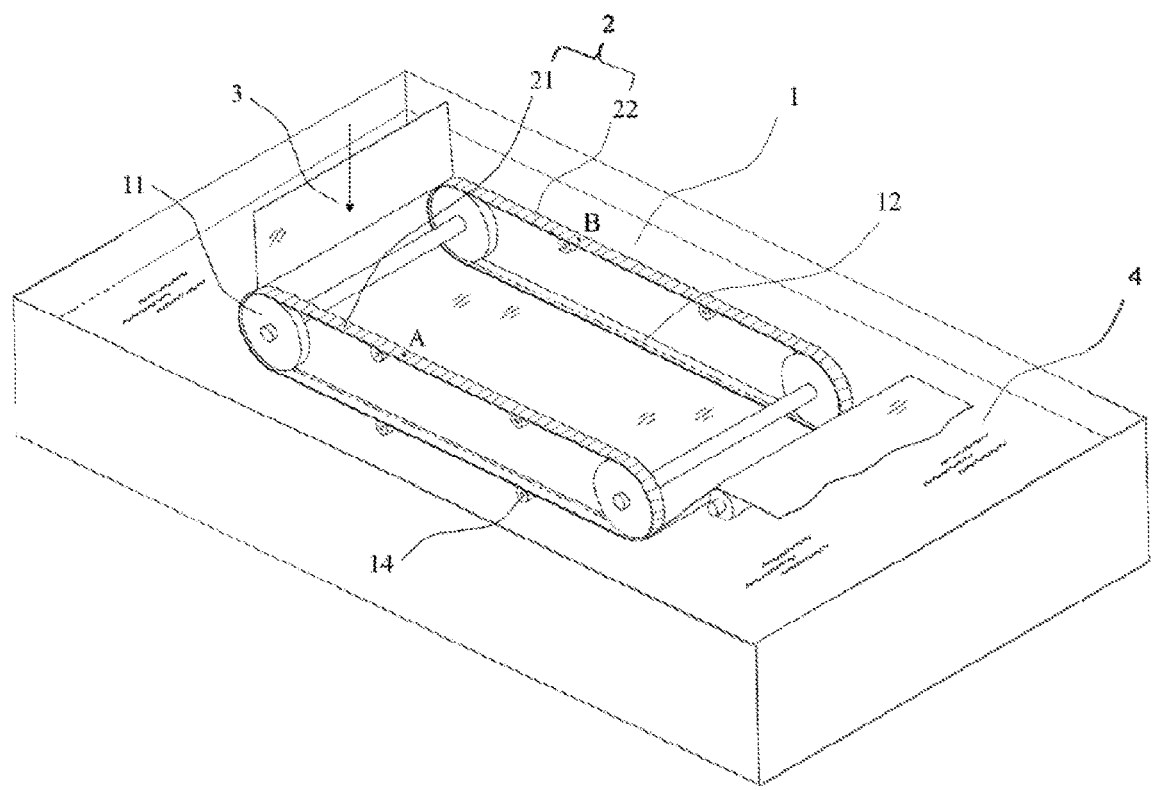
FIG. 9 is a schematic view shown a further another embodiment of the present disclosure.

Embodiment 28 is substantially the same as embodiment 21. The difference from embodiment 28 and embodiment 21 is that, in this embodiment, as shown in FIG. 9, the surface of the first carrier 21 in contact with the liquid membrane 3 has an arbitrary point A, the surface of the second carrier 22 in contact with the liquid membrane 3 has an arbitrary point B, and a line connecting the point A with the point B perpendiculars to the conveying direction of the liquid membrane 3. In a liquid membrane conveying process of the liquid membrane 3, the distance between the point A and the point B is changed by changing the movement path of the carrier unit 2, and the width of the carried liquid membrane 3 is accordingly changed. The minimum distance between point A and point B is L, the maximum distance between point A and point B is L', and the ratio between the minimum distance L and the maximum distance L' is 1:1.2.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A liquid membrane conveying apparatus for preparing a porous membrane comprising:

a transmission unit and a carrier unit, wherein the carrier unit conveys a liquid membrane into a gelling solution by an entrainment of the transmission unit, the carrier unit comprises at least one first carrier and at least one second carrier, the first carrier and the second carrier respectively contact with opposite edges of the liquid membrane along a conveying direction of the liquid membrane, and a portion between the opposite edges of the liquid membrane is not in contact with the carrier unit, without additional components, the liquid membrane is kept on the carrier unit by a contact force generated between the opposite edges of the liquid membrane and the carrier unit.

2. The liquid membrane conveying apparatus for preparing a porous membrane according to claim 1, wherein an area where the first carrier contacts with the liquid membrane accounts for 0.1% to 35.0% of the total area of the liquid membrane, and/or an area where the second carrier contacts with the liquid membrane accounts for 0.1% to 35.0% of the total area of the liquid membrane.

3. The liquid membrane conveying apparatus for preparing a porous membrane according to claim 1, wherein the surface of the carrier unit in contact with the liquid membrane is a planar surface, the planar surface comprises a first region and/or a second region, a roughness of the first region is smaller than a roughness of the second region, and the roughness of the second region is greater than or equal to 100.

4. The liquid membrane conveying apparatus for preparing a porous membrane according to claim 3, wherein the roughness of the second region is in a range from 100 to 1000.

5. The liquid membrane conveying apparatus for preparing a porous membrane according to claim 1, wherein the surface of the carrier unit in contact with the liquid membrane is a non-planar surface.

6. The liquid membrane conveying apparatus for preparing a porous membrane according to claim 5, wherein the surface of the carrier unit in contact with the liquid membrane comprises anti-slip structures and/or liquid storage structures, and a carrier surface with a solid region and a non-solid region is formed between the liquid membrane and the carrier unit.

7. The liquid membrane conveying apparatus for preparing a porous membrane according to claim 6, wherein the area ratio of the solid region and the non-solid region is in the range from 1:9 to 9:1.

8. The liquid membrane conveying apparatus for preparing a porous membrane according to claim 6, wherein the carrier surface comprises at least one solid region and at least one non-solid region, the solid region and the non-solid region are placed in an alternate manner.

9. The liquid membrane conveying apparatus for preparing a porous membrane according to claim 6, wherein the non-solid region comprises liquid region and/or gas region.

10. The liquid membrane conveying apparatus for preparing a porous membrane according to claim 6, wherein the anti-slip structure comprises projections and/or grooves, and/or the liquid storage structure comprises grooves and/or projections with indentations formed in the middle of the projections.

11. The liquid membrane conveying apparatus for preparing a porous membrane according to claim 10, wherein the projections comprise at least one of a ridge, a cylinder, a cylindrical tube, a cone, a truncated cone, a middle spherical frustum, an elliptic cylinder, a needle, a prism, a pyramid, a truncated pyramid, and a curve surface protrusion, and/or the grooves comprise grooves penetrating the carrier unit, and/or grooves not penetrating the carrier unit.

12. The liquid membrane conveying apparatus for preparing a porous membrane according to claim 11, wherein the grooves penetrating the carrier unit are configured in at least one of comb shape, tooth shape and hollow-carved shape.

13. The liquid membrane conveying apparatus for preparing a porous membrane according to claim 11, wherein the surface of the carrier unit in contact with the liquid membrane comprises a plurality of rectangular grooves not penetrating the carrier unit, the rectangular grooves comprise a plurality of first rectangular grooves, the long edges of the first rectangular grooves are parallel to each other and perpendicular to the conveying direction of the liquid membrane.

14. The liquid membrane conveying apparatus for preparing a porous membrane according to claim 13, wherein the width of the rectangular groove is in the range from 0.5 mm to 10.0 mm.

15. The liquid membrane conveying apparatus for preparing a porous membrane according to claim 13, wherein the rectangular grooves further comprise a plurality of second rectangular grooves, the long edges of the second rectangular grooves are parallel to each other and parallel to the conveying direction of the liquid membrane.

16. The liquid membrane conveying apparatus for preparing a porous membrane according to claim 15, wherein at least one of the first rectangular grooves connects with at least one of the second rectangular grooves.

17. The liquid membrane conveying apparatus for preparing a porous membrane according to claim 15, wherein at least one of the short edges of the first rectangular groove is opened, and/or at least one of the short edges of the second rectangular groove is opened.

18. The liquid membrane conveying apparatus for preparing a porous membrane according to claim 15, wherein in a direction perpendicular to the conveying direction of the liquid membrane, the first rectangular grooves and the second rectangular grooves are placed on the surface of the first carrier between a position close to the second carrier and a position away from the second carrier.

19. The liquid membrane conveying apparatus for preparing a porous membrane according to claim 15, wherein in a direction perpendicular to the conveying direction of the liquid membrane, the first rectangular grooves and the second rectangular grooves are placed on the surface of the second carrier between a position close to the first carrier and a position away from the first carrier.

20. The liquid membrane conveying apparatus for preparing a porous membrane according to claim 6, wherein in the conveying process, the liquid storage structures are kept in a liquid state.

21. The liquid membrane conveying apparatus for preparing a porous membrane according to claim 20, wherein in the conveying process, the surface of the carrier unit is subjected to a wetting process so that the liquid storage structure is kept in a liquid state.

22. The liquid membrane conveying apparatus for preparing a porous membrane according to claim 21, wherein the wetting process comprises spraying liquid to the surface of the carrier unit.

23. The liquid membrane conveying apparatus for preparing a porous membrane according to claim 22, wherein the liquid sprayed to the surface of the carrier unit is water.

24. The liquid membrane conveying apparatus for preparing a porous membrane according to claim 22, wherein a water content of the liquid is greater than a water content of the gelling solution.

25. The liquid membrane conveying apparatus for preparing a porous membrane according to claim 1, wherein the transmission unit comprises a transmission plate, the carrier unit is integrated with the transmission plate into a single piece, or the carrier unit is fixedly attached to the transmission plate.

26. The liquid membrane conveying apparatus for preparing a porous membrane according to claim 1, wherein the transmission unit comprises a driving wheel, a transmission chain and/or a transmission belt.

27. The liquid membrane conveying apparatus for preparing a porous membrane according to claim 26, wherein the transmission unit further comprises a supporting part, the supporting part comprises a supporting wheel, a roller or a gear.

28. The liquid membrane conveying apparatus for preparing a porous membrane according to claim 26, wherein the carrier unit is located on chain link of the transmission chain.

29. The liquid membrane conveying apparatus for preparing a porous membrane according to claim 28, wherein the carrier unit is integrated with the chain link of the transmission chain into a single piece or the carrier unit is fixedly attached to the chain link of the transmission chain.

30. The liquid membrane conveying apparatus for preparing a porous membrane according to claim 28, wherein the chain link comprises a link plate, the carrier unit is integrated with the link plate into a single piece or the carrier unit is fixedly attached to the link plate.

31. The liquid membrane conveying apparatus for preparing a porous membrane according to claim 26, wherein the carrier unit is integrated with the transmission belt into a single piece or the carrier unit is fixedly attached to the transmission belt.

32. The liquid membrane conveying apparatus for preparing a porous membrane according to claim 1, wherein the surface of the first carrier in contact with the liquid membrane has an arbitrary point A, the surface of the second carrier in contact with the liquid membrane has an arbitrary point B, in a liquid membrane conveying process of the liquid membrane, the distance between the point A and the point B is changed.

33. The liquid membrane conveying apparatus for preparing a porous membrane according to claim 32, wherein a line connecting the point A with the point B perpendiculars to the conveying direction of the liquid membrane.

34. The liquid membrane conveying apparatus for preparing a porous membrane according to claim 33, wherein the minimum distance between point A and point B is L, the maximum distance between point A and point B is L', and the ratio between the minimum distance L and the maximum distance L' is 1:1.2.

* * * * *